US010055905B2

(12) United States Patent
McConkey

(10) Patent No.: US 10,055,905 B2
(45) Date of Patent: Aug. 21, 2018

(54) HYPER-REDUNDANT SENSOR NODES

(71) Applicant: SIEMENS ENERGY, INC., Orlando, FL (US)

(72) Inventor: Joshua S. McConkey, Orlando, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 2 days.

(21) Appl. No.: 15/229,244

(22) Filed: Aug. 5, 2016

(65) Prior Publication Data

US 2018/0040175 A1 Feb. 8, 2018

(51) Int. Cl.
| | | |
|---|---|---|
| *G07C 5/08* | (2006.01) | |
| *F01D 21/00* | (2006.01) | |
| *F01D 21/14* | (2006.01) | |
| *G01M 15/14* | (2006.01) | |

(52) U.S. Cl.
CPC ......... *G07C 5/0808* (2013.01); *F01D 21/003* (2013.01); *F01D 21/14* (2013.01); *G01M 15/14* (2013.01); *F05D 2220/32* (2013.01); *F05D 2260/80* (2013.01)

(58) Field of Classification Search
CPC ..... G07C 5/0808; F01D 21/14; F01D 21/003; G01M 15/14; F05D 2260/80; F05D 2220/32
See application file for complete search history.

(56) References Cited

U.S. PATENT DOCUMENTS

| | | | |
|---|---|---|---|
| 2007/0038390 A1* | 2/2007 | Mansfield | G01F 1/8436 702/45 |
| 2015/0152791 A1* | 6/2015 | White | F02C 9/26 60/773 |
| 2015/0168230 A1* | 6/2015 | DeSilva | G01K 11/24 374/117 |
| 2017/0171807 A1* | 6/2017 | Noh | H04L 43/16 |

OTHER PUBLICATIONS

Bachmann, "Redundancy"; see attached PDF version.*

* cited by examiner

*Primary Examiner* — Mussa A Shaawat
*Assistant Examiner* — Michael V Kerrigan

(57) ABSTRACT

A hyper-redundant monitoring system and a gas turbine including the hyper-redundant monitoring system are provided. The hyper-redundant monitoring system includes a processor, a sensor node operably connected to the processor. The sensor node includes a plurality of sensors disposed in close proximity to one another such that a single parameter is measured by each of the plurality of sensors and each sensor is configured to transmit the parameter. The system also includes a power source and a controller in operable communication with the processor. The single parameter is output by each of the sensors and transmitted to the processor which collects the output parameters, analyzes the output parameters, and transmits analyzed data to the controller.

19 Claims, 2 Drawing Sheets

HYPER-REDUNDANT SENSOR NODES

BACKGROUND

1. Field

The present disclosure relates generally to sensor measurement on a gas turbine engine and more particularly, to a hyper-redundant sensor configuration for monitoring parameters within a gas turbine engine.

2. Description of the Related Art

Sensor networks have been used for monitoring various parameters of power generation units within a power generation plant, for example, to avoid possible system failures. These sensor networks typically include wired sensors, which may be installed on the same power and signal lines as the power generation units. These wired networks may carry high installation costs due to the need for running additional power and signal lines to each sensor, for example. Furthermore, existing sensor networks employ a long measurement chain, in that, the sensor is connected by lengthy cabling to data equipment which reads and analyzes the incoming sensor data. Some effort has been made to introduce wireless sensor networks within large industrial systems such as power generation units in a power generation plant, however, these efforts have met with security, power, and reliability issues.

As an example of a sensor used within a large industrial system, thermocouples are temperature sensors that are used within the turbine section of a gas turbine engine to give an indication of the condition of the rotor disc cavity. Each thermocouple sensor has wire leads coming out of the component that are connected back to a diagnostic unit. Instrumenting a plurality of thermocouples in this manner results in an extensive network of wires just for monitoring a single operating condition of temperature. With this extensive network of wires, comes an increased probability of damage to the individual wires, which is the number one source of instrumentation failure.

Traditionally, existing sensor networks in a power generation plant include large, analog sensors which are somewhat reliable and accurate but very expensive to operate. Transmitting analog data over the long measurement chain may also result in inaccuracies at the receiving end. Additionally, most sensors within a sensor network are not automatically monitored for drift, noise, location, and other important data. This data, or metadata, can assist plant operators to know when a maintenance condition is necessary requiring an outage, for example, or how to run the power plant more efficiently.

New technology advances have developed low cost and low power computing, low cost sensing, and low cost digital data transmission. Most of these devices also have the added advantage of being small, such as in the millimeter (or smaller) range. For example, MEMs (Micro-electro mechanical) sensors may range in size from 20 micrometeres to a millimeter. As an example of a new computing option, a Raspberry Pi computer may be as small as a postage stamp allowing it to be placed in the proximity of the sensors. Due to the reduction in the cost of high performance sensors, it is now feasible to arrange a plurality of sensors in a hyper-redundant configuration.

SUMMARY

Briefly described, aspects of the present disclosure relates to a hyper-redundant monitoring system and a gas turbine engine including a hyper-redundant monitoring system.

A hyper-redundant monitoring system is provided. The hyper-redundant monitoring system includes a processor, a sensor node operably connected to the processor, a power source, and a controller in operable communication with the processor. The sensor node includes a plurality of sensors disposed in close proximity to one another such that a single parameter is measured by each of the sensors and each sensor is configured to transmit the parameter to the processor. The single parameter is output by each of the sensors and transmitter to the processor. The processor then collects the output parameters by each of the sensors, analyzes the output parameters, and transmits analyzed data to the controller.

A gas turbine engine including the hyper-redundant monitoring system is also provided. The analyzed data is used by the controller to determine a need for a maintenance condition of the gas turbine engine.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

In general, a redundant sensor configuration employs multiple sensors, each performing the same function, i.e., measuring the same parameter at the same location. Likewise, a redundant computing configuration employs multiple computers to perform the same tasks having one computer designated as 'active' and at least a further computer designated as the 'standby' computer. Redundant configurations have been used to provide system fault tolerance, which is the ability of a system to perform its task after the occurrence of faults. For example, when a serious fault occurs on the 'active' operating computer, a switch to another functional 'standby' computer may be made where it then becomes the 'active' computer. Furthermore, a hyper-redundant configuration in which three or more redundant devices are employed may be used to more accurately and reliably provide measured data such as that data measured by sensors in a gas turbine engine. As a result, a 'soft' failure mode may exist in which one or more sensors have failed without a total functionality loss of the parameter measurement. Employing such a redundant monitoring system, may increase the reliability of such a monitoring system.

Figure 1:
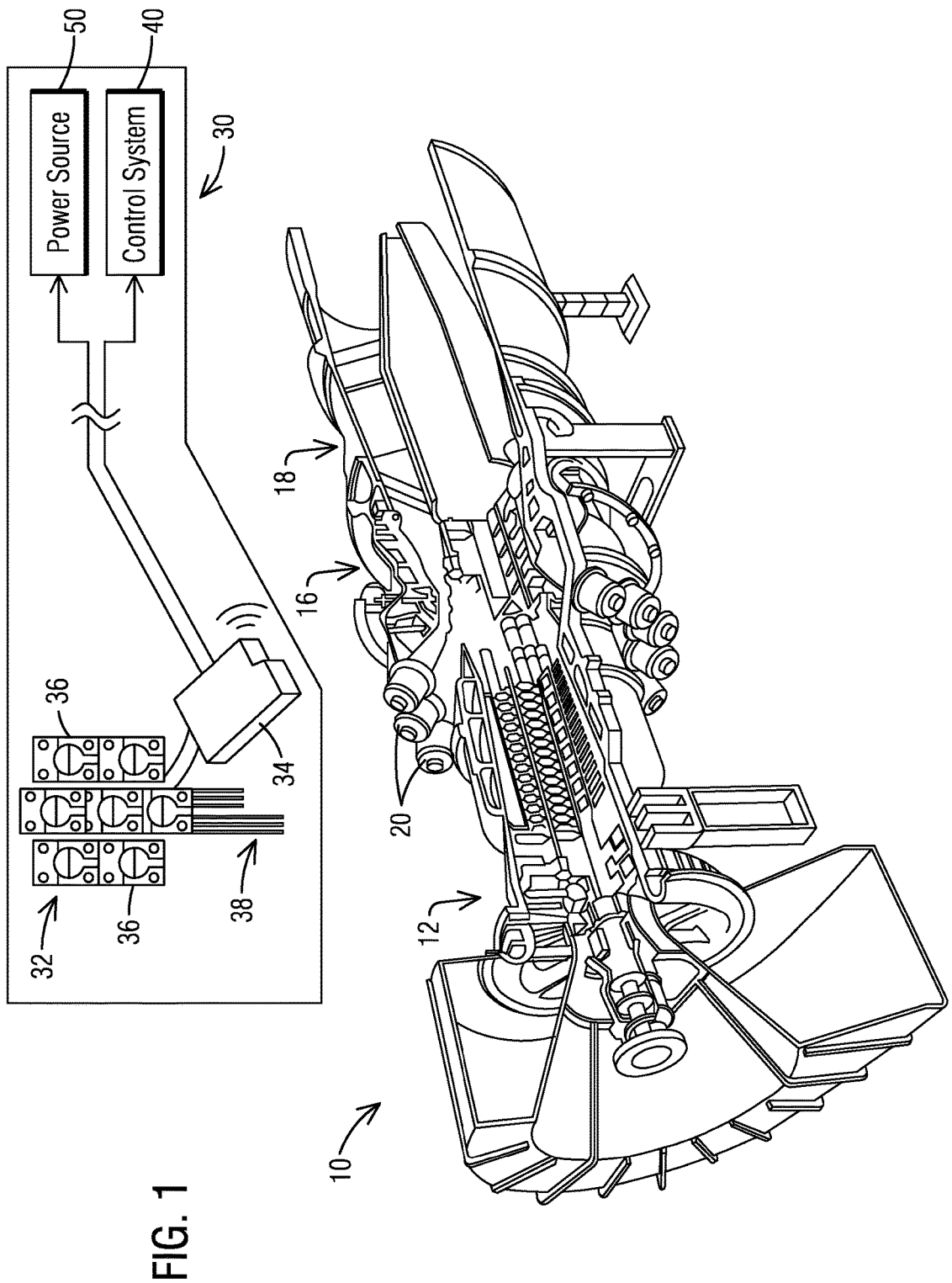
FIG. 1 illustrates a longitudinal view of a gas turbine engine including a hyper-redundant monitoring system.

Referring now to the figures, where the showings are for purposes of illustrating embodiments of the subject matter herein only and not for limiting the same, FIG. 1 illustrates an embodiment of a longitudinal view of a gas turbine engine including a hyper-redundant sensor monitoring system. The hyper-redundant monitoring system may include a controller which may be in operable communication with the gas turbine engine. Those skilled in the art would understand that the disclosed hyper-redundant monitoring system may be employed in many other industrial systems as well as the embodiment including a gas turbine engine as discussed, for exemplary purposes, below.

Referring to FIG. 1, an industrial gas turbine engine 10 is shown. The engine 10 includes a compressor section 12, a combustor section 14, a turbine section 16, and an exhaust section or system 18. The combustor section 14 includes a plurality of combustors 20. A hot working gas is conveyed from the combustor section 14 through to the turbine section 16. A hyper-redundant monitoring system 30 is shown including a sensor node 32 comprising a plurality of sensors 36, the sensor node 32 operably connected to a processor 34. In the shown embodiment, the processor 34 is a small, low cost computer. The sensors 36 are disposed in close proximity to one another such that each sensor 36 measures the same parameter, for example, the same pressure. The sensor leads 38 are shown for illustrative purposes; these sensor leads 38 would be in contact with the parameter being measured within the gas turbine. For example, the sensor node 32 may be disposed within a rotor disc cavity of the gas turbine engine in order to measure a temperature of the rotor disc cavity. The hyper-redundant monitoring system 30 may also include a controller 40 connected with the processor 34. The controller 40 may be in operable communication with the gas turbine 10 in order to use the measured parameter data for controlling the gas turbine 10 or a power plant. The parameter is output by each sensor 36, transmitted to the low cost computer 34, where it is analyzed, the analyzed data then transmitted to the controller 40. A power source 50 delivers power to the sensor node 32 via the processor 34.

In the embodiment of FIG. 1, the sensor node 32 includes more than four sensors 36. Typically, each sensor node 32 in the hyper-redundant configuration comprises a number of sensors 36 in a range from 3 to 8 sensors. Increasing the number of sensors 36 per node 32 has been shown to reduce sensor node failures exponentially. The sensors 36 may be of a MEMs structure or other monolithically produced sensor.

Each sensor 36 may measure the same parameter simultaneously or each sensor 36 may measure the same parameter in time division. Measuring in time division may be defined, for purposes of the present disclosure, as polling each sensor in sequence. For example, a sensor node 32 comprising four sensors 36 may be polled by the processor 34 once a second. The processor 34 would poll the sensors 36 in series, for example, one at 0.2 sec, one at 0.4 sec., one at 0.6 sec. and the last one at 0.8 sec, combine the readings, and produce an actual combined measurement for once a second.

The processor 34 may be located in close proximity to the sensor node 32. For example, the processor 34 may be located in a range of between 6 inches and 20 feet from the sensor node 32. This is advantageous because digitization of the sensor signals may be accomplished very close to the origination of data, minimizing the inaccuracy and cost associated with conserving the accuracy of analog signals. However, the processor 34 may also be located further away such as hundreds of feet from the sensor node 32. Having the processor 34 further away may be beneficial depending on the environment in which the sensors are disposed and if the sensors are capable of digitizing their output data which would obviate the concerns associated with analog signal transmission.

Sensor types used in the hyper-redundant monitoring system 30 may include thermocouples measuring temperature, pressure sensors measuring pressure, humidity sensors measuring the humidity at the location, level sensors measuring gas or fluid levels, and actuator sensors that measure valve or actuator positions, along with many other types of sensors. One skilled in the art would understand that other parameter measurements may also be possible.

Figure 2:
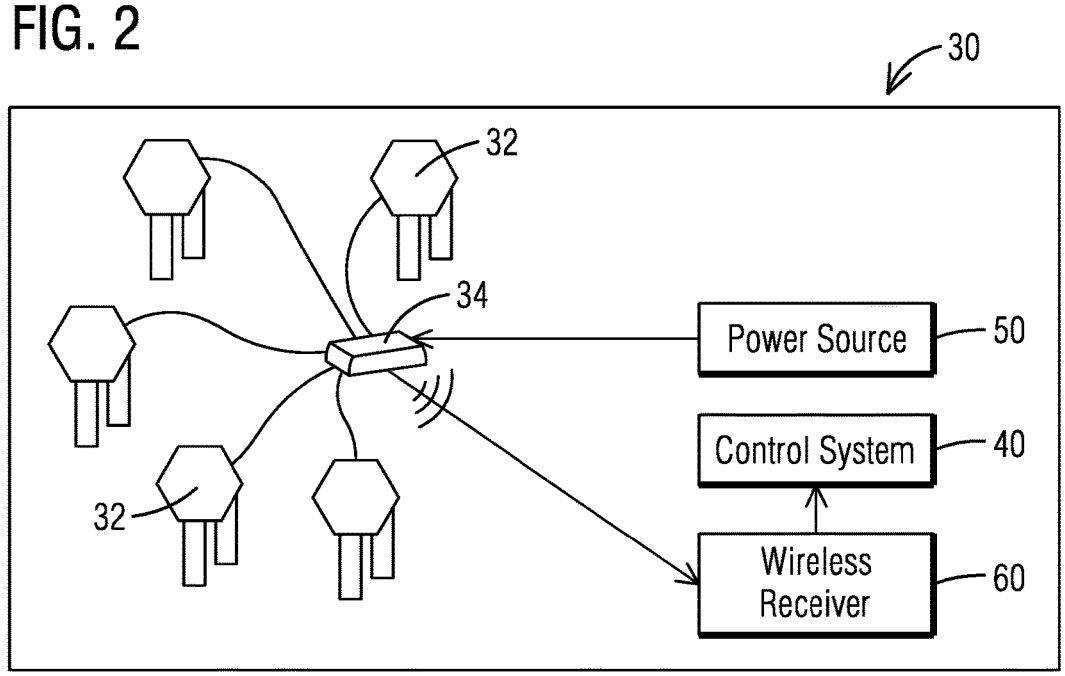
FIG. 2 illustrates a first embodiment of a hyper-redundant monitoring system.

A first embodiment of a hyper redundant monitoring system 30 configuration is illustrated by FIG. 2 which includes a plurality of hyper-redundant sensor nodes 32 connected to and controlled by a single processor 34. In this embodiment, the processor 34 resides in the center of a star-configuration of sensor nodes 32. Each sensor node 32 may receive power from a power source 50 via the processor 34 through a wired connection. Sensor data may be transmitted via data lines to the processor 34. The sensor data may then be analyzed and compiled by the processor 34 and transmitted wirelessly to a wireless receiver 60 to which a controller 40 has access.

Figure 3:
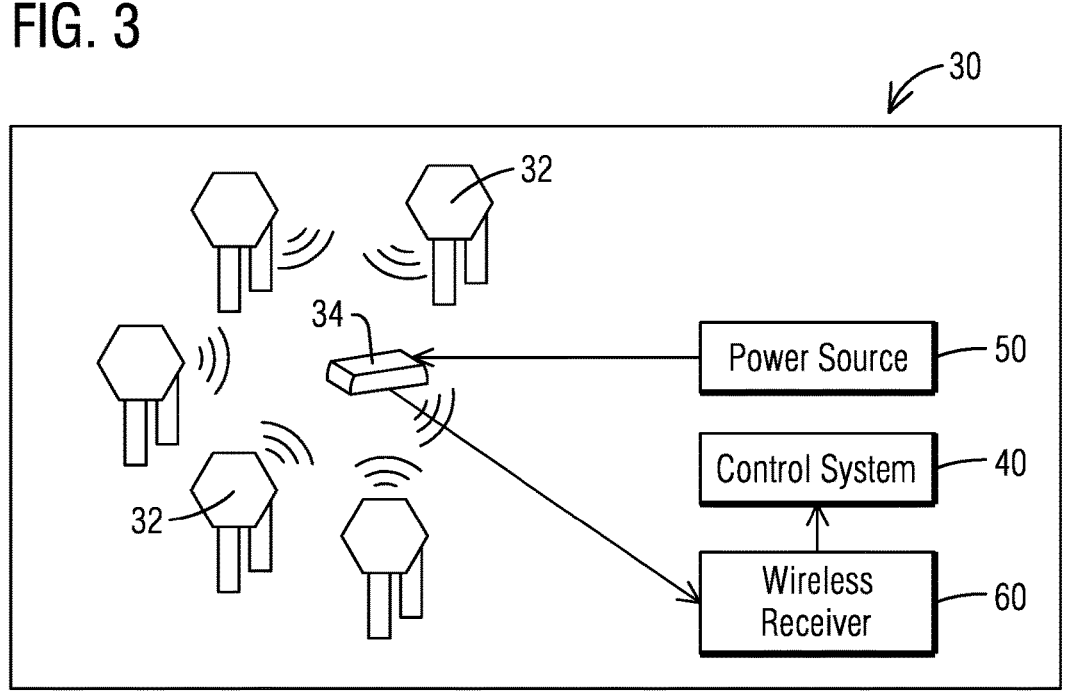
FIG. 3 illustrates a second embodiment of a hyper-redundant monitoring system.

A second embodiment of a hyper-redundant monitoring system configuration 30 is illustrated by FIG. 3. In this embodiment, a plurality of hyper-redundant sensor nodes 32 are connected to a processor 34 via a wireless connection. The sensor nodes 32 may receive power through a wired connection directly from the power source 50 to each sensor or power may be received by energy harvesting at each sensor. In the shown embodiment, the sensor data is transmitted wirelessly to the processor 34 to which the controller 40 has access. The processor 34 may report the analyzed data wirelessly, for example, using wireless LAN, Bluetooth, Wireless HART, or other protocols.

Similarly, to the redundant functionality the sensor node 32 provides, the functionality of the processor 34 may also be redundant with two or more processors 34 communicating with one or more sensor nodes 32. Self monitoring parameters within the redundant processors may be used to determine which processor 34 is the active one.

A single digital channel may carry all the parameter output data from one or more sensor nodes 32 to the processor 34, reducing the number of wires needed in the monitoring system 30. For example, a single ruggedized Cat 5/6 cable may be used to carry all the parameter output data.

Power may be delivered to each sensor node by various means. For example, as shown in the embodiment of FIG. 2, power may be delivered via a wire to each sensor node 32. In an alternate embodiment, each sensor 36 may derive power by energy harvesting. As an example of energy harvesting, solar energy may be captured and stored for use by the processor 34 and delivered to each sensor 36 wirelessly. This embodiment eliminates the number of wires needed by not running a separate wire to each sensor 36. Further, power may be delivered to the sensor node 32 by a data cable, for example a Cat5/6 data cable via a methodology called Power Over Ethernet. Thus, in this embodiment the data and power are carried by the same cable further reducing the number of wires needed.

The processor 34 may perform many functions including collecting the parameter outputs from the individual sensors, comparing the parameter outputs, voting, analyzing the data, and reporting the data to the controller 40. The hyper-redundant functionality of the sensors 36 enables the processor 34 the ability to compare the parameter data and disregard the low and high readings for example. Algorithms running on the processor 34 may analyze the output parameter to determine when a sensor 36 may be faulty and predict when an individual sensor 36 may require replacement.

As discussed previously, the redundancy enables the distinction of a 'soft' failure mode for the sensor node 32 defined by one or more sensors being considered faulty and needing repair or replacement. However, because at least one sensor is functional and reporting reliable and accurate data, the sensor node 32 may continue functioning with the ability to accurately measure the parameter for a longer period of time. Trending of individual sensor failures may enable scheduling of maintenance during a scheduled outage before a total sensor node 32 failure occurs. Additionally, the processor 34 may analyze the sensor output data providing statistics on the state and efficiency of the power plant. For example, these statistics may produce standard deviations, variances, relative drift, and other useful data.

Referring to FIGS. 1-3, a gas turbine engine 10 is also provided. The gas turbine engine 10 includes a hyper-redundant monitoring system 30 as described above. The analyzed data provided to the controller 40 by the processor 34 may be used to control aspects of the gas turbine engine 10 including shutting down the gas turbine when a maintenance condition is needed. For example, the processor 34 may predict when a sensor node 32 will fail such that no individual sensors will be operable. Before that occurs, the processor 34 can predict when a maintenance condition may be needed. With this information, the controller 40 may put the gas turbine 10 into an outage condition so that the individual sensors 36 of the sensor node 32 may be replaced.

A processor 34 in close proximity to the sensor node 32 may digitize the data and transmit the data in a different data formats precluding the need for multiplexing equipment routinely used between the sensor node 32 and the processor 34. Additionally, the data may be reconfigured to another data format from a user remotely accessing the processor 34.

It may be appreciated that in operation, the disclosed hyper-redundant monitoring system provides a very reliable, cost-effective solution to measuring various parameters on an industrial system. For example, the hyper-redundant sensor configuration enables a 'soft' failure mode allowing individual sensor failures without a total loss of functionality. Additionally, the processor can detect and report failures to a system controller in order to conveniently schedule sensor replacement and/or sensor repair. Integrating low cost computers and low cost sensors significantly decreases costs associated with system monitoring. Adding wireless communication from the sensor node to the processor and/or from the processor to a wireless receiver and on to a controller also eliminates costly wiring and failures due to wiring faults. In one application, the processor analyzes the parameter output data to provide a statistical analysis on the data. This statistical data may be used to by a controller to run a gas turbine engine more efficiently, for example.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A hyper-redundant monitoring system, comprising:
   a processor;
   a sensor node operably connected to the processor and comprising a plurality of sensors disposed in close proximity to one another such that a single parameter is measured by each of the plurality of sensors and each sensor is configured to transmit measurements of the single parameter to the processor;
   a power source that delivers power to the processor; and
   a controller in operable communication with the processor,
   wherein the processor collects the measurements of the single parameter by each of the plurality of sensors, analyzes the measurements of the single parameter to determine analyzed data, and transmits analyzed data to the controller,
   wherein the controller uses the analyzed data to change operating parameters on a gas turbine, and
   wherein the processor is disposed in close proximity to the sensor node such that the processor is disposed within the gas turbine engine casing.

2. The hyper-redundant monitoring system as claimed in claim 1, wherein the plurality of sensors number in a range of three to eight sensors.

3. The hyper-redundant monitoring system as claimed in claim 1, wherein the single parameter is simultaneously measured by each of the plurality of sensors.

4. The hyper-redundant monitoring system as claimed in claim 1, wherein the single parameter is measured in time-division by each of the plurality of sensors.

5. The hyper-redundant monitoring system as claimed in claim 1, wherein the processor is configured to determine when an output parameter by an individual sensor in the sensor node is faulty, and
   wherein the processor ignores the faulty measurement of the single parameter by not including the faulty measurement of the single parameter in the transmitted analyzed data.

6. The hyper-redundant monitoring system as claimed in claim 1, comprising a redundant computing network, the redundant computing network including the processor and a further processor,
   wherein the processor is configured to be redundant with the further processor, and
      wherein a self monitoring parameter within the redundant computing network is used to determine whether the processor or the further processor is active.

7. The hyper-redundant monitoring system as claimed in claim 6, wherein a plurality of sensor nodes is controlled by the redundant computing network.

8. The hyper-redundant monitoring system as claimed in claim 1, wherein a plurality of sensor nodes is controlled by the processor.

9. The hyper-redundant monitoring system as claimed in claim 1, wherein a cable comprising a single digital channel carries the measurements of the single parameter from the sensor node to the processor.

10. The hyper-redundant monitoring system as claimed in claim 9, wherein the power source is delivered by the cable to the sensor node.

11. The hyper-redundant monitoring system as claimed in claim 1, wherein the parameter is at least one of temperature, pressure, humidity, fluid level, actuator position, and vibration.

12. The hyper-redundant monitoring system as claimed in claim 1, wherein the processor communicates with the controller by way of wireless communication.

13. The hyper-redundant monitoring system as claimed in claim 1, wherein the sensor node communicates with the processor by way of wireless communication.

14. The hyper-redundant monitoring system as claimed by claim 13, wherein the plurality of sensors harvest energy.

15. The hyper-redundant monitoring system as claimed by claim 1, wherein each of the plurality of sensors comprising a MEMS structure.

16. The hyper-redundant monitoring system as claimed in claim 1, wherein each of the plurality of sensors in the sensor node is monitored for drift, noise, and location.

17. The hyper-redundant monitoring system as claimed in claim 1, wherein the controller uses the analyzed data to change operating parameters on a gas turbine.

18. The hyper-redundant monitoring system as claimed in claim 17, wherein the operating parameters comprises one or more of pressure, temperature, humidity, vibration, actuator position, and fluid level.

19. A gas turbine engine, comprising;
a hyper-redundant monitoring system of claim 1, wherein the analyzed data is used by the controller to determine a need for a maintenance condition of the gas turbine engine,
wherein when the control system determines a maintenance condition is needed the controller shuts down the gas turbine engine.

* * * * *